(12) United States Patent
Castinado

(10) Patent No.: US 11,176,498 B2
(45) Date of Patent: *Nov. 16, 2021

(54) LINEAGE IDENTIFICATION AND TRACKING OF RESOURCE INCEPTION, USE, AND CURRENT LOCATION

(71) Applicant: BANK OF AMERICA CORPORATION, Charlotte, NC (US)

(72) Inventor: Joseph Benjamin Castinado, North Glenn, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 171 days.

This patent is subject to a terminal disclaimer.

(21) Appl. No.: 16/692,253

(22) Filed: Nov. 22, 2019

(65) Prior Publication Data

US 2020/0090086 A1    Mar. 19, 2020

Related U.S. Application Data

(63) Continuation of application No. 15/443,020, filed on Feb. 27, 2017, now Pat. No. 10,489,726.

(51) Int. Cl.
G06Q 10/06     (2012.01)
G06N 10/00     (2019.01)
G06N 5/00      (2006.01)

(52) U.S. Cl.
CPC ......... G06Q 10/0631 (2013.01); G06N 5/003 (2013.01); G06N 10/00 (2019.01)

(58) Field of Classification Search
USPC ....................................................... 705/7.12
See application file for complete search history.

(56) References Cited

U.S. PATENT DOCUMENTS 6,339,765 B1   1/2002  Maher
7,135,701 B2   11/2006  Amin et al.
(Continued)

FOREIGN PATENT DOCUMENTS

AU    2010249233 A1    6/2011
CA    2886849 A1    10/2016
(Continued)

OTHER PUBLICATIONS

Aaronson, Scott, Quantum Money, Aug. 2012, Communications of the ACM, vol. 55, No. 8, pp. 84-92 (Year: 2012).*

*Primary Examiner* — Matthew D Henry
*Assistant Examiner* — Kristin E Gavin
(74) *Attorney, Agent, or Firm* — Michael A. Springs; Moore & Van Allen PLLC; Nicholas C. Russell

(57) ABSTRACT

Embodiments of the invention are directed to systems, methods and computer program products for a lineage identification and tracking system. The system generates codes each resource instrument created, such as physical or paper resource instrument, with an index that can track the instrument via a qubit. The coded index is stored. During the life of the resource instrument a quantum optimizer may be utilized for lineage tracking of the instrument. Thus, generating an assigned traceability finger print for the life of the instrument generating a lineage tree. Thus, the invention identifies the instrument and that the instrument can only be at one place at one time, thus providing aid in detecting misappropriation of physical or paper resource instruments.

20 Claims, 5 Drawing Sheets

(56) References Cited

U.S. PATENT DOCUMENTS

| | | |
|---|---|---|
| 7,418,283 B2 | 8/2008 | Amin |
| 7,533,068 B2 | 5/2009 | Maassen van den Brink et al. |
| 7,619,437 B2 | 11/2009 | Thom et al. |
| 7,639,035 B2 | 12/2009 | Berkley |
| 7,898,282 B2 | 3/2011 | Harris et al. |
| 7,903,863 B2 * | 3/2011 | Jones .................. G06Q 20/042 382/135 |
| 8,008,942 B2 | 8/2011 | van den Brink et al. |
| 8,190,548 B2 | 5/2012 | Choi |
| 8,195,596 B2 | 6/2012 | Rose et al. |
| 8,283,943 B2 | 10/2012 | van den Brink et al. |
| 8,421,053 B2 | 4/2013 | Bunyk et al. |
| 8,559,694 B2 | 10/2013 | Jenrick et al. |
| 8,744,075 B2 | 6/2014 | Tanaka |
| 8,897,449 B1 | 11/2014 | Broadbent |
| 9,207,672 B2 | 12/2015 | Williams et al. |
| 9,246,675 B2 | 1/2016 | Ding |
| 9,400,499 B2 | 7/2016 | Williams et al. |
| 9,537,660 B2 | 1/2017 | Wang et al. |
| 10,133,603 B2 | 11/2018 | Kendall |
| 2004/0139000 A1 | 7/2004 | Amos |
| 2005/0010508 A1 | 1/2005 | Groz |
| 2006/0088157 A1 | 4/2006 | Fujii |
| 2006/0251247 A1 | 11/2006 | Akiyama et al. |
| 2011/0258121 A1 | 10/2011 | Kauniskangas et al. |
| 2012/0002008 A1 | 1/2012 | Valin et al. |
| 2013/0117200 A1 * | 5/2013 | Thom .................... B82Y 10/00 705/36 R |
| 2014/0279526 A1 | 9/2014 | Jackson |
| 2015/0012478 A1 | 1/2015 | Mohammad et al. |
| 2021/0014201 A1 * | 1/2021 | Crabtree ................ G06N 7/005 |

FOREIGN PATENT DOCUMENTS

| | | |
|---|---|---|
| CN | 101834724 A | 9/2010 |
| CN | 101867474 A | 10/2010 |
| CN | 102025491 A | 4/2011 |
| CN | 102664732 A | 9/2012 |
| CN | 103200000 A | 7/2013 |
| CN | 103200001 A | 7/2013 |
| CN | 103312498 A | 9/2013 |
| CN | 103338448 A | 10/2013 |
| CN | 104504601 A | 4/2015 |
| EP | 2462717 A1 | 6/2012 |
| KR | 100563907 B1 | 3/2006 |
| WO | WO-2008083498 A1 * | 7/2008 ............. G06N 10/00 |
| WO | 2010105993 A1 | 9/2010 |
| WO | 2015149035 A1 | 10/2015 |

* cited by examiner

LINEAGE IDENTIFICATION AND TRACKING OF RESOURCE INCEPTION, USE, AND CURRENT LOCATION

CROSS-REFERENCE TO RELATED APPLICATIONS

This application is a continuation application of U.S. Non-provisional patent application Ser. No. 15/443,020, filed Feb. 27, 2017 titled Lineage Identification and Tracking of Resource Inception, Use, and Current Location the contents of which are hereby incorporated by reference in its entirety.

BACKGROUND

With advancements in technology, user resource access and distribution without authorization is becoming easier. As such, third parties may be able to manipulate resource access and distribution.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to systems and methods for lineage identification and tracking of resource instruments, the invention comprising: a classical computer apparatus and a quantum optimizer in communication with the classical computer apparatus: comprising identifying an inception of one or more resource instruments; coding each of the one or more resource instruments with an index, wherein the index is in the form of a qubit received from the quantum optimizer; triggering activation of the index based on initial circulation of the resource instrument into a public domain; identifying a use of one or more resource instruments within the public domain; sending a communication to the quantum optimizer for a request to generate a lineage track of a selected one or more resource instruments via the index; wherein the quantum optimizer is configured for: receiving the request for the lineage track of the selected one or more resource instruments from the classical computer apparatus; analyzing the index to generate a lineage tree of the selected one or more resource instruments to generate a digital finger print of the lineage of the selected one or more resource instruments; and coding the generated lineage tree into a readable format for the classical computer and present the lineage tree to the classical computer.

In some embodiments, the classical computer receives the generated lineage tree in the readable format and provides an interface for a user to review the lineage tree for the selected one or more resource instruments.

In some embodiments, the lineage tree of the selected resource instrument further comprises an ordered history of the inception, each transaction, and a current location of the selected one or more resource instruments.

In some embodiments, the selected resource instrument is a misappropriated resource instrument, wherein the lineage tree of the selected resource instrument further identifies a current location of the selected one or more resource instruments to track a location of a misappropriated resource instrument.

In some embodiments, identifying the use of one or more resource instruments within the public domain further comprises receiving a signal from a third party system indicating the one or more resource instruments were used to complete a transaction at a merchant.

In some embodiments, the one or more resource instruments further comprise physical paper currency.

In some embodiments, the classical computer apparatus further receives a communication from an entity that the one or more resource instruments has been removed from circulation, wherein upon removal from circulation the index is recirculated to code a new one or more resource instruments with the index.

In some embodiments, the invention further comprises storing each transaction using the one or more resource instruments with the index as a data point for generation of the lineage tree.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
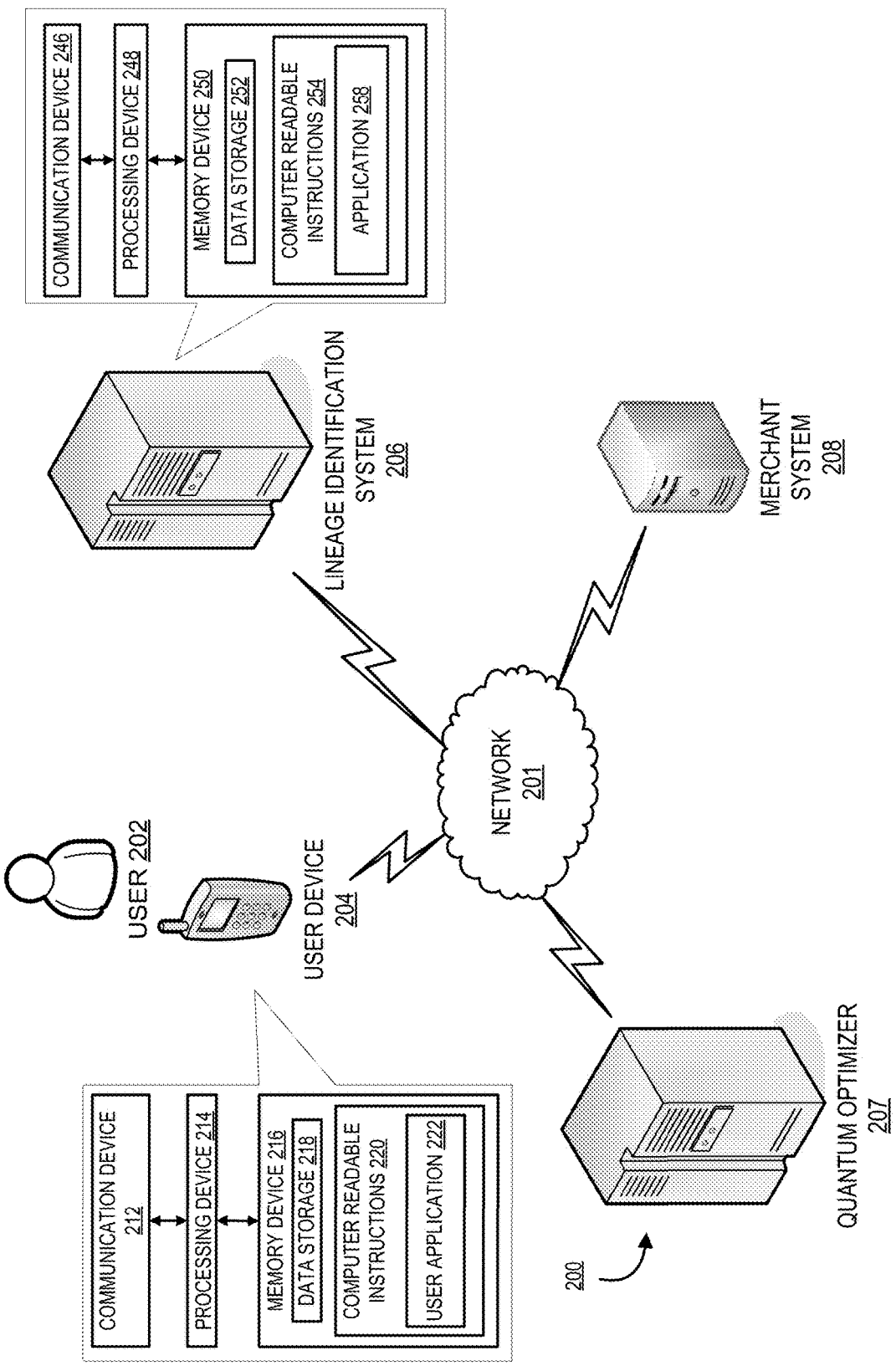
Figure 2:
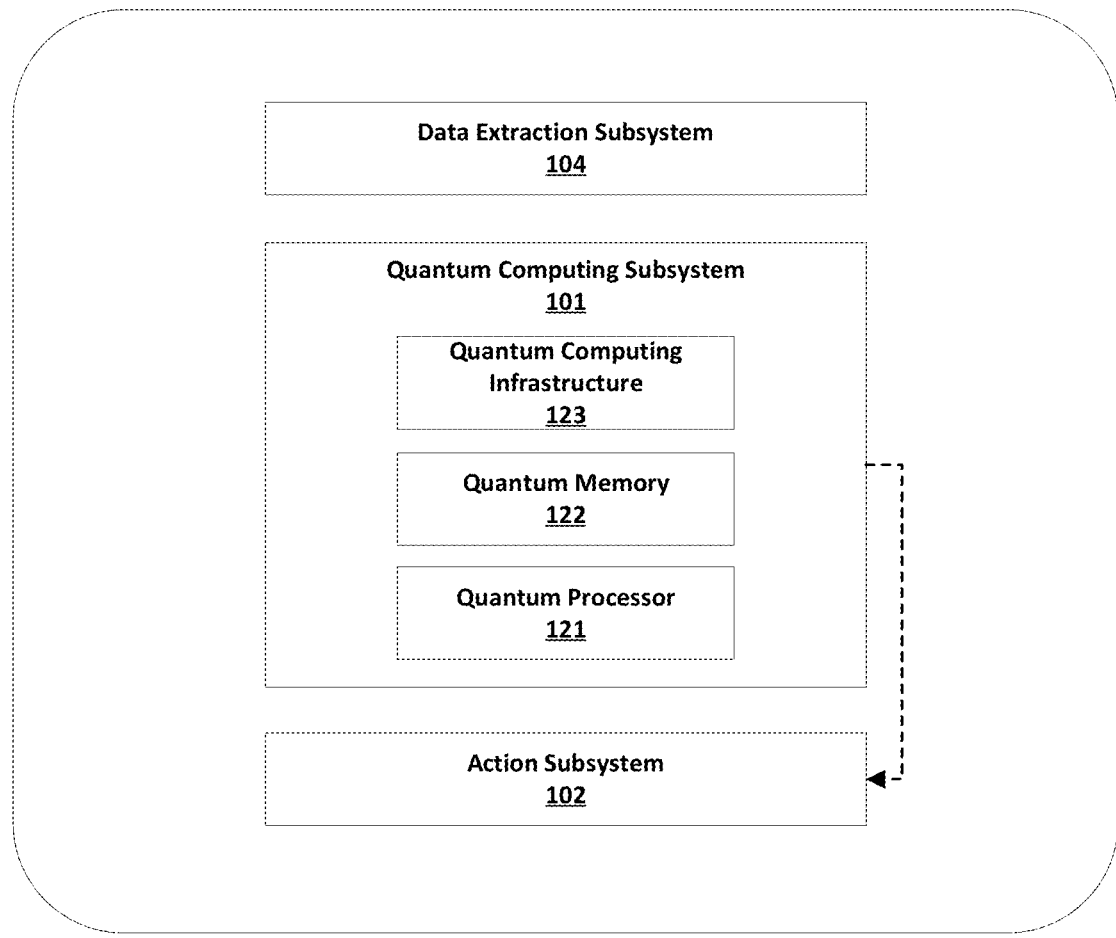
Figure 3:
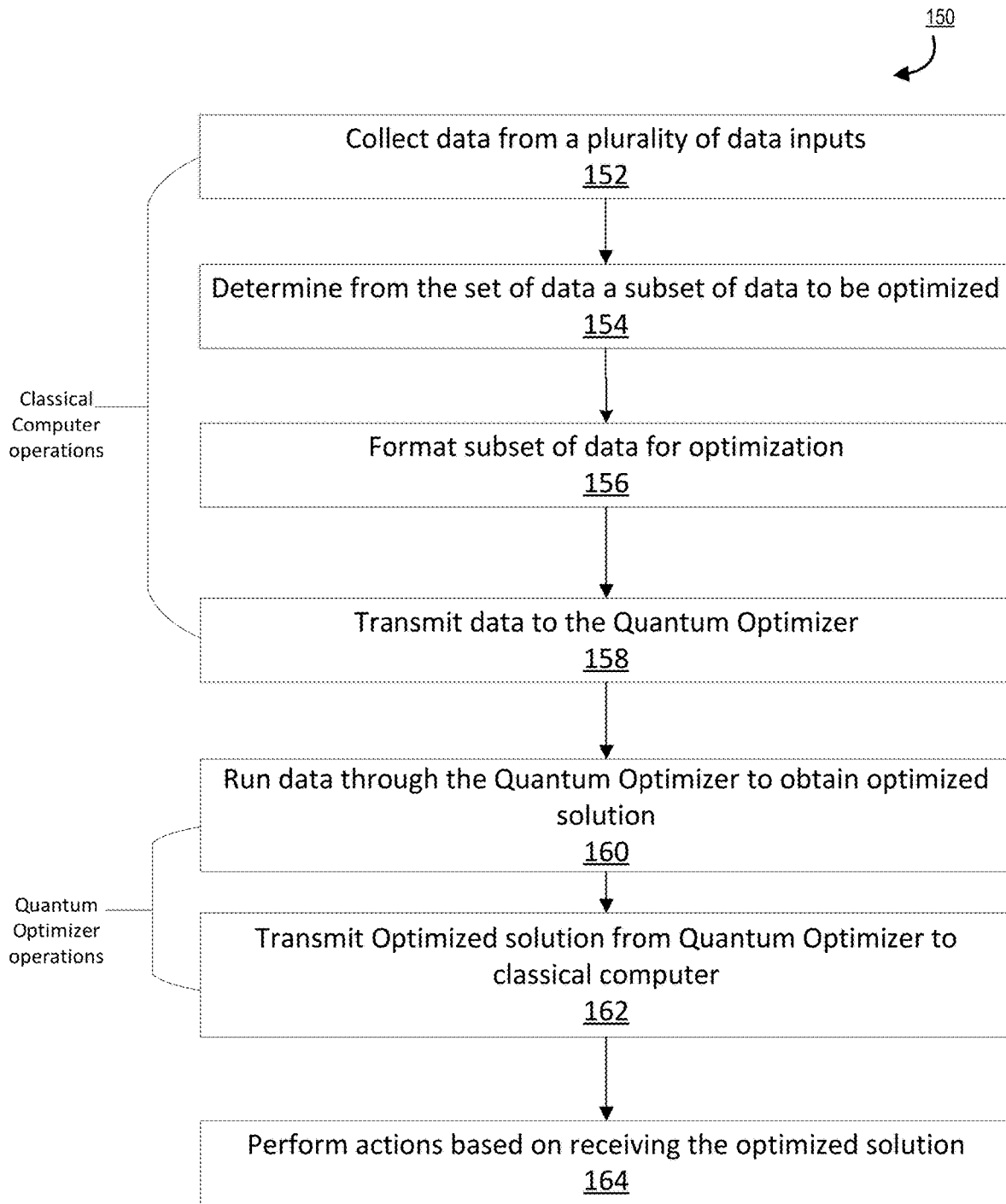
Figure 4:
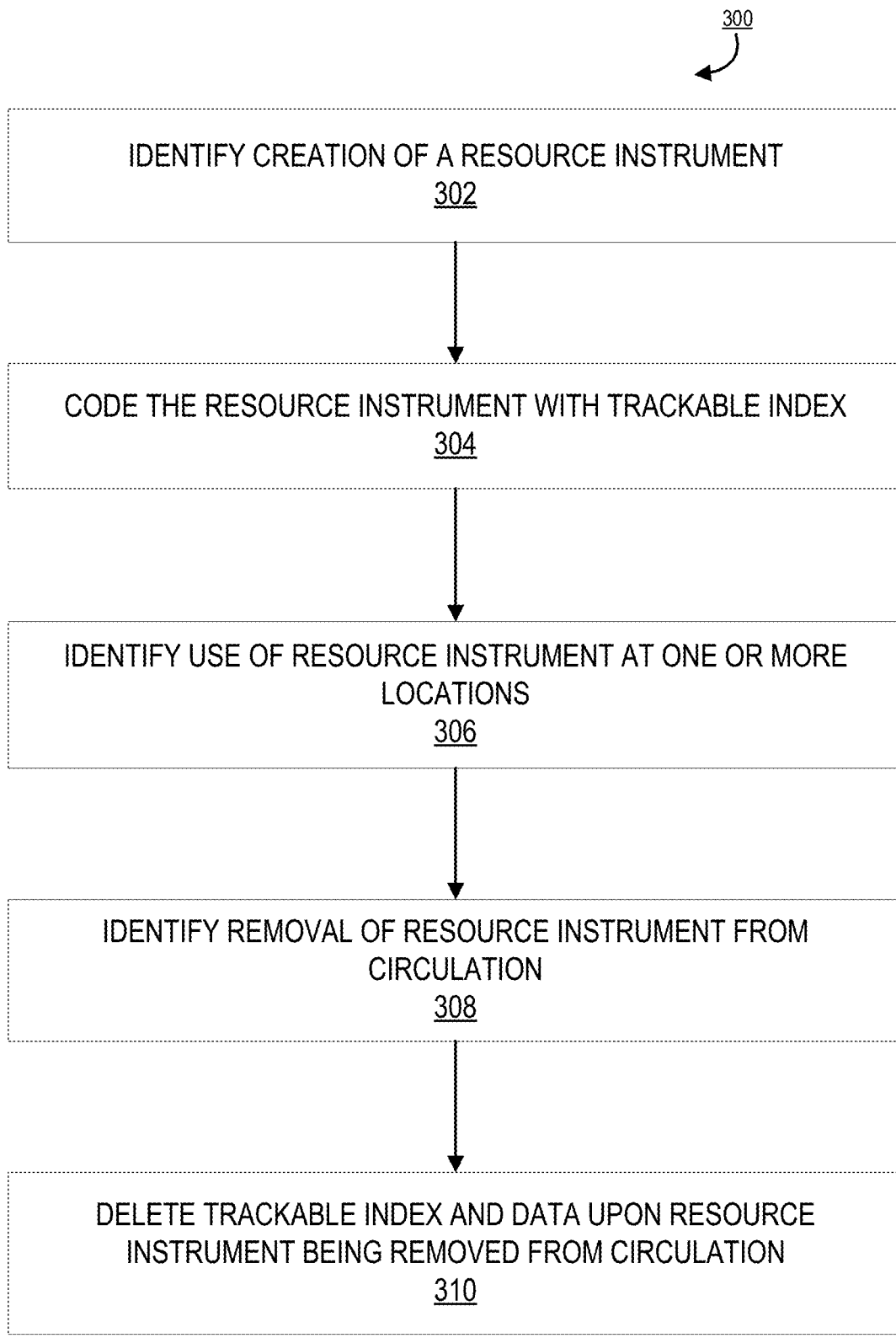
Figure 5:
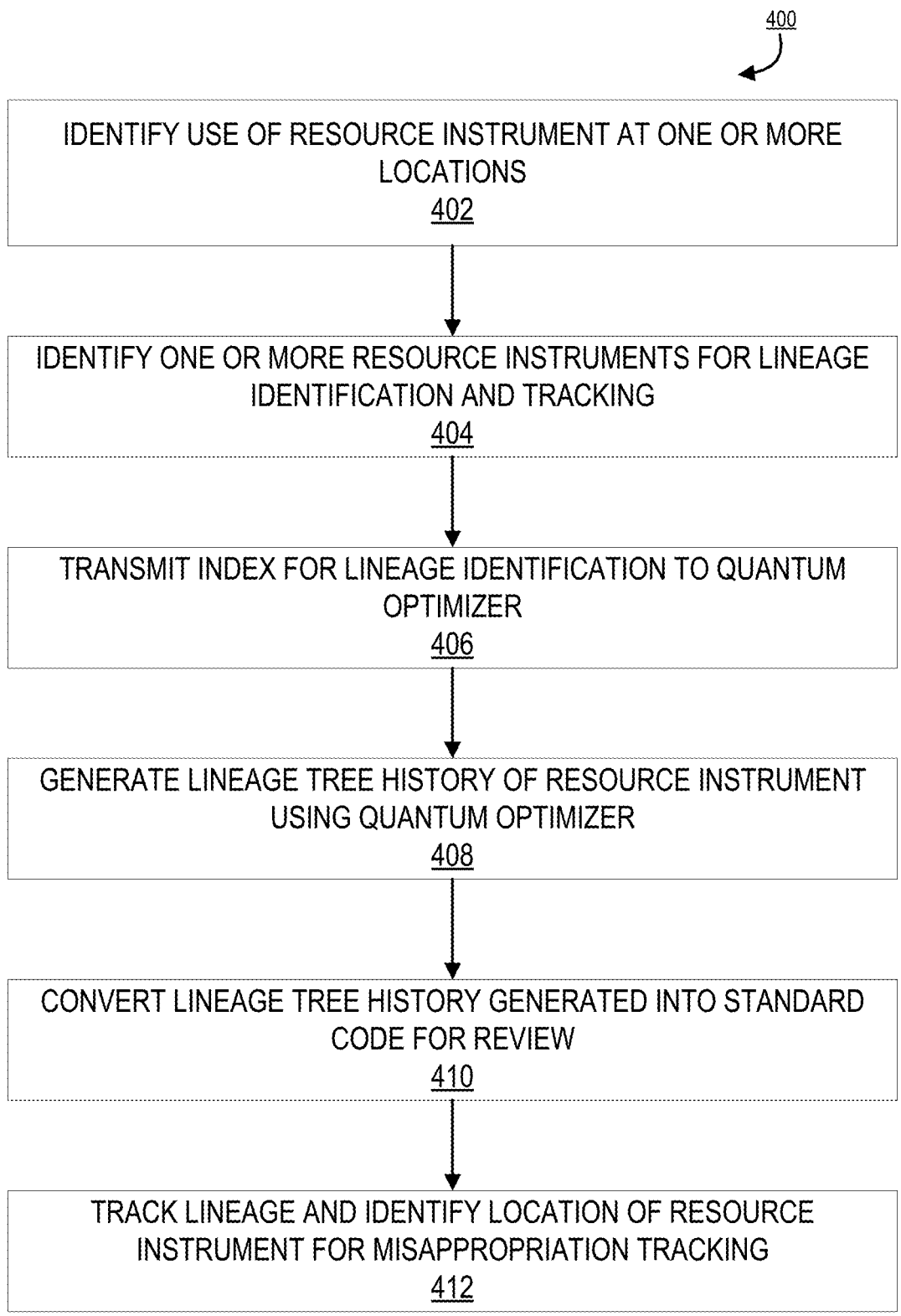

Having thus described embodiments of the invention in general terms, reference will now be made to the accompanying drawings, where:

FIG. 1 illustrates a lineage identification and tracking system environment, in accordance with embodiments of the present invention;

FIG. 2 is a diagram of a quantum optimizer, in accordance with embodiments of the present invention;

FIG. 3 is a flowchart illustrating the utilization of quantum computer within a lineage identification framework, in accordance with embodiments of the present invention;

FIG. 4 is a flowchart illustrating resource instrument index coding process, in accordance with embodiments of the present invention; and FIG. 5 is a flowchart illustrating lineage identification and tracking for generation of a resource instrument tree, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account resource transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading resource onto stored value cards (SVCs) and/or prepaid cards; donating to charities; and/or the like.

In some embodiments, an instrument of value or resource instrument as used herein may refer to any type of physical paper currency, digital currency, and/or digital transaction, including coin, dollar, check number, online payment, or the like.

In some embodiments, an "entity" may be a financial institution. For the purposes of this invention, a "financial institution" may be defined as any organization, entity, or the like in the business of moving, investing, or lending resources, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself. In some embodiments, the "user" may be a customer (e.g., an account holder) or an individual completing a transaction.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

In some embodiments, the invention is a lineage identification and tracking system comprising a quantum computer function in coordination with general computer function. As such, the system manipulates standard computer data and triggers a communication of that data to a quantum optimizer for required quantum analytics. The system then manipulates the data for subsequent conversion to general computer coding. As such, the system codes every dollar printed (and digital currency) with an index that can track the dollar printed via a qubit. As such, every dollar created at a mint is coded with a unique qubit. The system stores the qubits and utilizes the quantum optimizer for analytics and lineage tracking when necessary. In this way, any time that dollar is used in a transaction or as an assignment of value, it is assigned a traceability finger print. This way, the system may identify the lineage of each dollar printed, knowing where it was printed, traveled to a financial institution, used at a merchant, or in a user's possession. Quantum optimizer power allows the system to know what user's dollars are being used for such that misappropriation can be detected and tracked when paper currency is involved. In this way, each dollar can only be at one place at one time, thus the system is able to aid in detecting misappropriation and the like.

In some embodiments, the system may identify the completion of a transaction using the paper currency by using the computation processing of completed transactions. As such, the system can trace or follow the lineage of each and every physical paper currency, digital currency, and/or digital transaction to determine its previous uses. The system may then use that lineage tree history of the coin, dollar, check number, online payment, or the like to find out all prior uses and if certain users have used that instrument of value illegal, illicit or irregular activities.

FIG. 1 illustrates a lineage identification and tracking system environment 200, in accordance with embodiments of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of generating logic code for lineage identification and tracking of resource inception, use, and current location.

As illustrated in FIG. 1, the merchant system 208 is operatively coupled, via a network 201 to the user device 204, quantum optimizer 207, and to the lineage identification system 206. In this way, the merchant system 208 can send information to and receive information from the user device 204, quantum optimizer 207, and the lineage identification system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that possesses or has possessed each resource instrument. In some embodiments, the user 202 may have completed a transaction at a merchant system 208 using paper resources. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the lineage identification system 206, the merchant system 208, and the quantum optimizer 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222.

As further illustrated in FIG. 1, the lineage identification system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the merchant system 208, the quantum optimizer 207, and the user device 204. As such, the communication device 246 generally comprises a modem, server, or other device for communicating with other devices on the network 201.

As further illustrated in FIG. 1, the lineage identification system 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the lineage identification system 206 the memory device 250 stores an application 258. Furthermore, the lineage identification system 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more merchant system 208, quantum optimizer 207, and/or user device 204.

In some embodiments, the lineage identification system 206 via the application may communicate with the quantum optimizer 207 to allow for quantum processing of data. In this way, the application 258 may provide lineage identification and tracking. As such, the application 258 may manipulate standard computer data and triggers a communication of that data to a quantum optimizer 207 for required quantum analytics. The application 258 then manipulates the data for subsequent conversion to general computer coding. As such, the application 258 codes every resource instrument with an index that can track the printing, flow through the market, and current location via a qubit. The application 258 may store the qubits and utilizes the quantum optimizer 207 for analytics and lineage tracking when necessary. In some embodiments, the application 258 may identify the completion of a transaction using the resource instrument by using the computation processing of completed transactions from a financial institution, user device 204, the merchant system 208, or the like. As such, the application 258 can trace or follow the lineage of each and every physical paper currency, digital currency, and/or digital transaction to determine its previous uses. The application 258 may then use that lineage tree history of the coin, dollar, check number, online payment, or the like to find out all prior uses and if certain users have used that instrument of value illegal, illicit or irregular activities.

As illustrated in FIG. 1, the quantum optimizer 207 is connected to at least the lineage identification system 206. The quantum optimizer is described in more detail below with respect to FIG. 2. The quantum optimizer 207 may be associated with one or more entities. In this way, the quantum optimizer 207 may be associated with a third party, a financial institution, or the like.

As illustrated in FIG. 1, the merchant system 208 is connected to the quantum optimizer 207, user device 204, and lineage identification system 206. In some embodiments, the merchant system 208 may be a third party system separate from the lineage identification system 206. The merchant system 208 has the same or similar components as described above with respect to the user device 204 and the lineage identification system 206. While only one merchant system 208 is illustrated in FIG. 1, it is understood that multiple merchant system 208 may make up the system environment 200.

It is understood that the servers, systems, and devices described herein illustrate one embodiment of the invention. It is further understood that one or more of the servers, systems, and devices can be combined in other embodiments and still function in the same or similar way as the embodiments described herein. The merchant system 208 may generally include a processing device communicably coupled to devices as a memory device, output devices, input devices, a network interface, a power source, one or more chips, and the like. The merchant system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the merchant system 208 described herein.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations.

FIG. 2 is a schematic diagram of an exemplary Quantum Optimizer 207 that can be used in parallel with a classical computer to solve optimization problems. The Quantum Optimizer 207 is comprised of a Data Extraction Subsystem 104, a Quantum Computing Subsystem 101, and an Action Subsystem 102. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 2, the Data Extraction Subsystem 104 communicates with the network to extract data for optimization. It will be understood that any method of communication between the Data Extraction Subsystem 104 and the network is satisfactory including but not limited to wired communication and the like. The Data Extraction Subsystem 104 then formats the data for optimization in the Quantum Computing Subsystem.

As further depicted in FIG. 2, the Quantum Computing Subsystem 101 comprises a Quantum Computing Infrastructure 123, a Quantum Memory 122, and a Quantum Processor 121. The Quantum Computing Infrastructure 123 comprises physical components for housing the Quantum Processor 121 and the Quantum Memory 122. The Quantum Computer Infrastructure 123 further comprises a cryogenic refrigeration system to keep the Quantum Computing Subsystem 101 at the desired operating conditions. In general, the Quantum Processor 121 is designed to perform adiabatic quantum computation and/or quantum annealing to optimize data received from the Data Extraction Subsystem 104. The Quantum Memory 122 is comprised of a plurality of qubits used for storing data during operation of the Quantum Computing Subsystem 101. In general, qubits are any two-state quantum mechanical system. It will be understood that the Quantum Memory 122 may be comprised of any such two-state quantum mechanical system, such as the polarization of a single photon, the spin of an electron, and the like.

The Action Subsystem 102 communicates the optimized data from the Quantum Computing Subsystem 101 over the network. It will be understood that any method of communication between the Data Extraction Subsystem 104 and the network is satisfactory including but not limited to wired communication and the like.

FIG. 3 is a high level process flow of utilization of quantum computer within a lineage identification framework 150, in accordance with some embodiments of the invention. As depicted in FIG. 3, a classical computer begins the process at step 152 by collecting data from a plurality of inputs. At step 154, the classical computer then determines from the set of data collected at step 152 a subset a data to be optimized. The classical computer then formats the subset of data for optimization at step 156. At step 158, the classical computer transmits the formatted subset of data to the Quantum Optimizer. The Quantum Optimizer runs the data to obtain the optimized solution at 160. The Quantum Optimizer then transmits the optimized data back to the classical computer at step 162. Finally, the classical computer can perform actions based on receiving the optimized solution at step 164.

FIG. 4 illustrates a resource instrument index coding process 300, in accordance with embodiments of the present invention. As illustrated in block 302, the process 300 is initiated by identifying creation of a resource instrument. In this way, the resource instrument may be created at a mint (such as a paper dollar, coin, or the like), a financial institution, a digital currency generation system, or the like. As such, the system may link to the devices used to generate the resource instrument at the location of creation of the resource instrument.

Upon linkage of the system to the devices associated with creation of the resource instrument, the process 300 continues in block 304 by coding the resource instrument with a trackable index. In some embodiments, the trackable index may be printed or otherwise affixed to the resource instrument. In some embodiments, the system may utilize a serial number already associated with the resource instrument as the trackable index. The trackable index is coded for a unique qubit that allows for the tracking of the resource instrument. In this way, each qubit is a unique to that individual resource instrument. As such, the qubit can be in a superposition of up to $2^n$ states simultaneously. The use of the qubit prevents the potential for running out of unique index data points for the resource instrument since, for example two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

In some embodiments, each attribute of the resource instrument may contribute to the code of the resource instrument. As such, each attribute, such as a serial number, smudge, mark, bend, crease, coloring, or the like may be coded within a qubit to identify that particular resource instrument in the future.

Once the resource instrument has been created and coded, the system may identify the distribution and circulation of the resource instrument into the public. At that point, the index for that particular resource instrument is queued.

Next, as illustrated in block 306, the process 300 continues by identifying the use of the resource instrument at one or more locations. As such, upon circulation of the resource instrument, the system may monitor for use of the resource instrument. In some embodiments, the merchant point-of-transaction location may be capable, via the merchant system, to scan the index of the resource instrument in order to identify the use of the resource instrument at that location. In other embodiments, the index may comprise a positioning indicator embedded into the resource instrument where the system may be able to identify the location of the resource instrument. In some embodiments, the system stores the identified use for optimization by the quantum optimizer, if necessary.

The system may continually monitor the use of the resource instrument throughout the life of the instrument. In some embodiments, the system may be requested to present tree of the location and transfer of the resource instrument through its lifetime. Furthermore, the system may be requested to present information about the location of the resource instrument at the current time in order to identify potential misappropriation. The generation of the lineage identification and current location of the resource instrument is further detailed below in FIG. 5.

As illustrated in block 308, the process 300 continues by deleting the trackable index and data associated therewith upon indication of the resource instrument being removed from public circulation. As such, upon indication of the resource instrument being positioned for removal from circulation and being destroyed, the system may remove the index from being associated with that resource instrument and remove any stored information associated with that index. The index may then be utilized for newly created resource instrument again.

FIG. 5 is a flowchart illustrating lineage identification and tracking for generation of a resource instrument tree 400, in accordance with embodiments of the present invention. As illustrated in block 402, the process 400 is initiated by identifying a user of the resource instrument at one or more locations. As such, upon circulation of the resource instrument, the system may monitor for use of the resource instrument. In some embodiments, the merchant point-of-transaction location may be capable, via the merchant system, to scan the index of the resource instrument in order to identify the use of the resource instrument at that location. In other embodiments, the index may comprise a positioning indicator embedded into the resource instrument where the system may be able to identify the location of the resource instrument. In some embodiments, the system stores the identified use for optimization by the quantum optimizer, if necessary. The system may continually monitor the use of the resource instrument throughout the life of the instrument. In some embodiments, the system may be requested to present tree of the location and transfer of the resource instrument through its lifetime. Furthermore, the system may be requested to present information about the location of the resource instrument at the current time in order to identify potential misappropriation.

As illustrated in block 404, the process 400 continues by identifying one or more resource instruments for lineage identification and tracking. In some embodiments, the system may receive an input from one or more users or entity representatives that request the system for a lineage identification and tracking. In other embodiments, the system may determine one or more resource instruments for lineage identification and tracking to generate a tree history of the resource instruments from its inception to the resource instrument current location.

Next, as illustrated in block 406, the process 400 continues by transmitting the index for lineage identification to the quantum optimizer. In this way, once the resource instrument for lineage tracking is determined, the index for the lineage identification is identified. In this way, the index, with qubits may be sent to the quantum optimizer for lineage identification of one or more resource instruments. As such, the system using the quantum optimizer provides a method of solving optimization problems by using a classical computer in conjunction with a quantum optimizer. As such, a classical computer begins the method at step by collecting the index data from resource instruments. Each data point coordinates with the inception of the resource instrument, a location the resource instrument was used during each transaction, the resource instrument current location, and the like. As such, the classical computer then determines from the set of data collected a subset a data to be optimized, such as the subset is all the data points associated with a single resource instrument. The classical computer then formats the subset of data for optimization. The classical computer transmits the formatted subset of data to the quantum optimizer. The quantum optimizer runs the data to obtain the optimized solution. The quantum optimizer then transmits the optimized data back to the classical computer in a classical computer format. Finally, the classical computer can perform actions based on receiving the optimized solution.

Once the qubits associated with the index for the one or more resource instruments for lineage identification is presented to the quantum optimizer, the quantum optimizer generates a lineage tree that illustrates a history of the resource instrument, as illustrated in block 408. In this way, the quantum optimizer may coordinate and systematically orientate the data points of the index of the resource instrument for generation of a lineage for the resource instrument from inception to current location within a tree format for visualization.

The quantum optimizer generates a lineage of the resource instrument including a date and time of inception of the resource instrument, each transaction associated with the resource instrument, the current location of the resource instrument, and the time and date associated with each data point. Furthermore, in some embodiments, the system using the index may identify the merchant of the transaction and the individual associated with the transaction.

Next, as illustrated in block 410, the quantum optimizer converts the lineage tree history generated by the quantum optimizer into a standard code for standard computer review and retention. As such, a user may be able to visualize the lineage tree history generated by the quantum optimizer for visualization of the lineage of the resource instrument and current location. As illustrated in block 412, the process 400 is completed by tracking the lineage and allow for identification of resource instrument for misappropriation tracking. In this way, the system identifies the location of the resource instrument and use of the resource instrument through its life time. The user may be able to utilize the lineage tree to identify a location of the resource instrument, identify the use of and location of potentially misappropriated resource instruments. In some embodiments, the system may be able to queue the index of the resource instrument for destruction such that the resource instrument may not be able to be utilized for additional transactions.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for lineage identification and tracking of resource instruments, the system comprising:
   a classical computer apparatus comprising:
      a processor;
      a memory; and
      a lineage application that is stored in the memory and executable by the processor;
   a quantum optimizer in communication with the classical computer apparatus, the quantum optimizer comprising:
      a quantum processor; and
      a quantum memory;
   wherein the classical computer is configured for:
      identifying an inception of one or more resource instruments;
      coding each of the one or more resource instruments with an index;
      triggering activation of the index based on initial circulation of the resource instrument into a public domain;
      sending a communication to the quantum optimizer for a request to generate a lineage track of a selected one or more resource instruments via the index;
   wherein the quantum optimizer is configured, based on the communication received, for:
      receiving the request for the lineage track of the selected one or more resource instruments from the classical computer apparatus;
      coordinating data points of the index based on qubit recognition for lineage identification of the one or more resource instruments based on qubit recognition for generation of a lineage for the one or more resource instruments;
      generating a lineage tree of the selected one or more resource instruments to generate a digital finger print of the lineage of the selected one or more resource instruments from inception to current location within a tree format for visualization; and
      coding the generated lineage tree into a readable format for the classical computer and present the lineage tree to the classical computer.

2. The system of claim 1, wherein the classical computer receives the generated lineage tree in the readable format and provides an interface for a user to review the lineage tree for the selected one or more resource instruments.

3. The system of claim 1, wherein the lineage tree of the selected resource instrument further comprises an ordered history of the inception, each transaction, and a current location of the selected one or more resource instruments.

4. The system of claim 1, wherein the selected resource instrument is a misappropriated resource instrument, wherein the lineage tree of the selected resource instrument further identifies a current location of the selected one or more resource instruments to track a location of a misappropriated resource instrument.

5. The system of claim 1, wherein identifying the use of one or more resource instruments within the public domain further comprises receiving a signal from a third party system indicating the one or more resource instruments were used to complete a transaction at a merchant.

6. The system of claim 1, wherein the one or more resource instruments further comprise physical paper currency.

7. The system of claim 1, wherein the classical computer apparatus further receives a communication from an entity that the one or more resource instruments has been removed from circulation, wherein upon removal from circulation the index is recirculated to code a new one or more resource instruments with the index.

8. The system of claim 1, further comprising storing each transaction using the one or more resource instruments with the index as a data point for generation of the lineage tree.

9. A computer-implemented method for lineage identification and tracking of resource instruments, the method comprising:
- providing a classical computer system comprising a computer processing device and a non-transitory computer readable medium, where the computer readable medium comprises configured computer program instruction code, such that when said instruction code is operated by said computer processing device, said computer processing device performs the following operations:
  - identifying an inception of one or more resource instruments;
  - coding each of the one or more resource instruments with an index;
  - triggering activation of the index based on initial circulation of the resource instrument into a public domain;
  - sending a communication to the quantum optimizer for a request to generate a lineage track of a selected one or more resource instruments via the index;
- a quantum optimizer in communication with the classical computer system, wherein the quantum optimizer is configured, based on the communication received, for:
  - receiving the request for the lineage track of the selected one or more resource instruments from the classical computer apparatus;
  - coordinating data points of the index based on qubit recognition for lineage identification of the one or more resource instruments based on qubit recognition for generation of a lineage for the one or more resource instruments;
  - generating a lineage tree of the selected one or more resource instruments to generate a digital finger print of the lineage of the selected one or more resource instruments from inception to current location within a tree format for visualization; and
  - coding the generated lineage tree into a readable format for the classical computer and present the lineage tree to the classical computer.

10. The computer-implemented method of claim 9, wherein the classical computer receives the generated lineage tree in the readable format and provides an interface for a user to review the lineage tree for the selected one or more resource instruments.

11. The computer-implemented method of claim 9, wherein the lineage tree of the selected resource instrument further comprises an ordered history of the inception, each transaction, and a current location of the selected one or more resource instruments.

12. The computer-implemented method of claim 9, wherein the selected resource instrument is a misappropriated resource instrument, wherein the lineage tree of the selected resource instrument further identifies a current location of the selected one or more resource instruments to track a location of a misappropriated resource instrument.

13. The computer-implemented method of claim 9, wherein identifying the use of one or more resource instruments within the public domain further comprises receiving a signal from a third party system indicating the one or more resource instruments were used to complete a transaction at a merchant.

14. The computer-implemented method of claim 9, wherein the one or more resource instruments further comprise physical paper currency.

15. The computer-implemented method of claim 9, wherein the classical computer apparatus further receives a communication from an entity that the one or more resource instruments has been removed from circulation, wherein upon removal from circulation the index is recirculated to code a new one or more resource instruments with the index.

16. The computer-implemented method of claim 9, further comprising storing each transaction using the one or more resource instruments with the index as a data point for generation of the lineage tree.

17. A computer program product for lineage identification and tracking of resource instruments, the computer program product comprising at least one non-transitory computer-readable medium having computer-readable program code portions embodied therein on a classical computer apparatus in communication with a quantum optimizer configured for:
- an executable portion configured for identifying an inception of one or more resource instruments;
- an executable portion configured for coding each of the one or more resource instruments with an index;
- an executable portion configured for triggering activation of the index based on initial circulation of the resource instrument into a public domain;
- an executable portion configured for sending a communication to the quantum optimizer for a request to generate a lineage track of a selected one or more resource instruments via the index;
- wherein the quantum optimizer is configured, based on the communication received, for:
- an executable portion configured for receiving the request for the lineage track of the selected one or more resource instruments from the classical computer apparatus;
- an executable portion configured for coordinating data points of the index based on qubit recognition for lineage identification of the one or more resource instruments based on qubit recognition for generation of a lineage for the one or more resource instruments;
- an executable portion configured for generating a lineage tree of the selected one or more resource instruments to generate a digital finger print of the lineage of the selected one or more resource instruments from inception to current location within a tree format for visualization; and
- an executable portion configured for coding the generated lineage tree into a readable format for the classical computer and present the lineage tree to the classical computer.

18. The computer program product of claim 17, wherein the classical computer receives the generated lineage tree in the readable format and provides an interface for a user to review the lineage tree for the selected one or more resource instruments.

19. The computer program product of claim 17, wherein the lineage tree of the selected resource instrument further comprises an ordered history of the inception, each transaction, and a current location of the selected one or more resource instruments.

20. The computer program product of claim 17, wherein the selected resource instrument is a misappropriated resource instrument, wherein the lineage tree of the selected resource instrument further identifies a current location of the selected one or more resource instruments to track a location of a misappropriated resource instrument.

\* \* \* \* \*